(12) United States Patent
Claywell et al.

(10) Patent No.: US 9,004,047 B2
(45) Date of Patent: Apr. 14, 2015

(54) ENGINE ASSEMBLY HAVING A BAFFLE IN THE INTAKE MANIFOLD

(71) Applicant: GM Global Technology Operations LLC, Detroit, MI (US)

(72) Inventors: Mark R. Claywell, Birmingham, MI (US); Daniel J. Hommes, Metamora, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/851,150

(22) Filed: Mar. 27, 2013

(65) Prior Publication Data

US 2014/0290629 A1  Oct. 2, 2014

(51) Int. Cl.
 *F02M 15/00* (2006.01)
 *F02M 35/104* (2006.01)
 *F02M 35/10* (2006.01)

(52) U.S. Cl.
 CPC ..... *F02M 35/1045* (2013.01); *F02M 35/10354* (2013.01)

(58) Field of Classification Search
 USPC .................. 123/542, 184.21, 184.24, 184.32, 123/184.34, 184.36, 184.38, 184.42
 See application file for complete search history.

(56) References Cited

U.S. PATENT DOCUMENTS

| | | | | |
|---|---|---|---|---|
| 1,818,283 | A | * | 8/1931 | Spencer .................. 123/184.38 |
| 3,807,376 | A | * | 4/1974 | Glockler et al. .......... 123/568.19 |
| 5,537,965 | A | * | 7/1996 | Topfer et al. ............. 123/184.42 |
| 5,704,325 | A | * | 1/1998 | Sattler et al. ............. 123/184.42 |
| 5,758,625 | A | * | 6/1998 | Ponti ............................ 123/476 |
| 7,243,644 | B2 | * | 7/2007 | Okamoto et al. ............. 123/673 |
| 8,176,889 | B2 | * | 5/2012 | Fukuda et al. ........... 123/184.21 |
| 8,286,615 | B2 | * | 10/2012 | Dehnen et al. ................ 123/542 |

* cited by examiner

*Primary Examiner* — Marguerite McMahon
*Assistant Examiner* — James Kim
(74) *Attorney, Agent, or Firm* — Quinn Law Group, PLLC

(57) ABSTRACT

An engine assembly generally includes an engine and an intake manifold. The engine includes a plurality of cylinders. The plurality of cylinders includes a pair of cylinders. The engine is configured to sequentially fire the pair of cylinders. The intake manifold defines a plurality of ports. Each port is in fluid communication with one of the plurality of cylinders. The plurality of ports includes a pair of ports. Each of the pair of ports is disposed in fluid communication with one of the pair of cylinders. The intake manifold further includes a baffle disposed between the pair of ports to restrict fluid flow within the intake manifold between the pair of ports.

14 Claims, 4 Drawing Sheets

US 9,004,047 B2

ENGINE ASSEMBLY HAVING A BAFFLE IN THE INTAKE MANIFOLD

TECHNICAL FIELD

The present disclosure relates to an engine assembly including an internal combustion engine and an intake assembly configured to minimize cylinder-to-cylinder imbalance.

BACKGROUND

Internal combustion engines may combust a mixture of air and fuel in cylinders and thereby produce drive torque. Combustion of the air-fuel mixture procures exhaust gases. Engines may include intake ports to direct air flow to the combustion chambers and exhaust ports to direct exhaust gases from the combustion chambers. An intake manifold may be used to direct air flow to the intake ports.

SUMMARY

The present disclosure relates to engine assemblies. In an embodiment, the engine assembly generally includes an engine and an intake manifold. The engine includes a plurality of cylinders. The plurality of cylinders includes a pair of cylinders. The engine is configured to consecutively fire the pair of cylinders. The intake manifold defines a plurality of ports. Each port is in fluid communication with one of the plurality of cylinders. The plurality of ports includes a pair of ports. Each of the pair of ports is disposed in fluid communication with one of the pair of cylinders. The intake manifold further includes a baffle disposed between the pair of ports to restrict fluid flow within the intake manifold between the pair of ports.

In an embodiment, the intake manifold includes a plenum elongated along a manifold axis. The baffle extends from the plenum and is elongated along a baffle axis. The baffle axis is substantially perpendicular or obliquely angled relative to the manifold axis.

In an embodiment, the engine assembly further includes an intercooler disposed within the intake manifold. The intercooler and the baffle jointly define an opening therebetween. The opening is configured to allow fluid flow between the pair of ports.

The present disclosure further relates to motor vehicles. In an embodiment, the vehicle generally includes an engine and an intake assembly. The engine includes a first cylinder bank and a second cylinder bank. The first cylinder bank includes a first pair of cylinders. The engine is configured to fire the first pair of cylinders in succession. The second cylinder bank includes a second pair of cylinders. The engine is configured to fire the second pair of cylinders in succession. The intake assembly includes an intake manifold. The intake manifold defines a first pair of ports and a second pair of ports. Each of the first pair of ports is disposed in fluid communication with one of the first pair of cylinders. Each of the second pair of ports is in fluid communication with the one of the second pair of cylinders. The intake assembly further includes first and second baffles disposed within the intake manifold. The first baffle is disposed between the first pair of ports. The second baffle is disposed between the second pair of ports.

The engine block defines first, second, third, fourth, fifth, sixth, seventh, and eighth cylinders. The first, third, fifth, and seventh cylinders are part of the first cylinder bank. The second, fourth, sixth, and eighth cylinders are part of the second cylinder bank. The first pair of cylinders includes the first and third cylinders. The first baffle is disposed within the intake manifold between the first and third cylinders.

In an embodiment, the first baffle is located closer to the third cylinder than to the first cylinder. The second pair of cylinders includes the second cylinder and the sixth cylinder. The second baffle is disposed within the intake manifold between the second and sixth cylinder. The second baffle may be specifically disposed within the intake manifold between the fourth cylinder and the sixth cylinder.

In an embodiment, the engine block defines first, second, third, fourth, fifth, sixth, seventh, and eighth cylinders. The first, third, fifth, and seventh cylinders are part of the first cylinder bank. The second, fourth, sixth, and eighth cylinders are part of the second cylinder bank. The first pair of cylinders includes the first and fifth cylinders. The first baffle is disposed within the intake manifold between the first and fifth cylinders. The first baffle may be specifically disposed within the intake manifold between the third and fifth cylinders. The second pair of firing cylinders includes the sixth cylinder and the eighth cylinder. The second baffle is disposed within the intake manifold between the sixth cylinder and the eighth cylinder. The second baffle may be disposed closer to the sixth cylinder than to the eighth cylinder.

In an embodiment, the intake assembly includes a plurality of ports. The plurality of ports includes the first pair of ports and a second pair of ports. The intake assembly may further include at least one flow restrictor disposed within the intake manifold and between two of the plurality of ports.

In an embodiment, the intake assembly includes an intercooler disposed within the intake manifold. The intercooler and the first baffle may jointly define an opening therebetween. The opening is configured to allow fluid flow between the first pair of ports.

The present disclosure also relates to methods of manufacturing an engine assembly. In an embodiment, the method includes fluidly coupling an intake assembly to an internal combustion engine. The internal combustion engine includes a plurality of cylinders. The plurality of cylinders includes a pair of cylinders. The engine is configured to consecutively fire the pair of cylinders. The intake assembly includes an intake manifold. The intake manifold defines a plurality of ports. Each port is in fluid communication with one of the plurality of cylinders. The plurality of ports includes a pair of firing ports. Each of the pair of ports is disposed in fluid communication with one of the pair of firing cylinders. The method further includes disposing a baffle within the intake manifold between the pair of ports to restrict fluid flow between the pair of ports.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
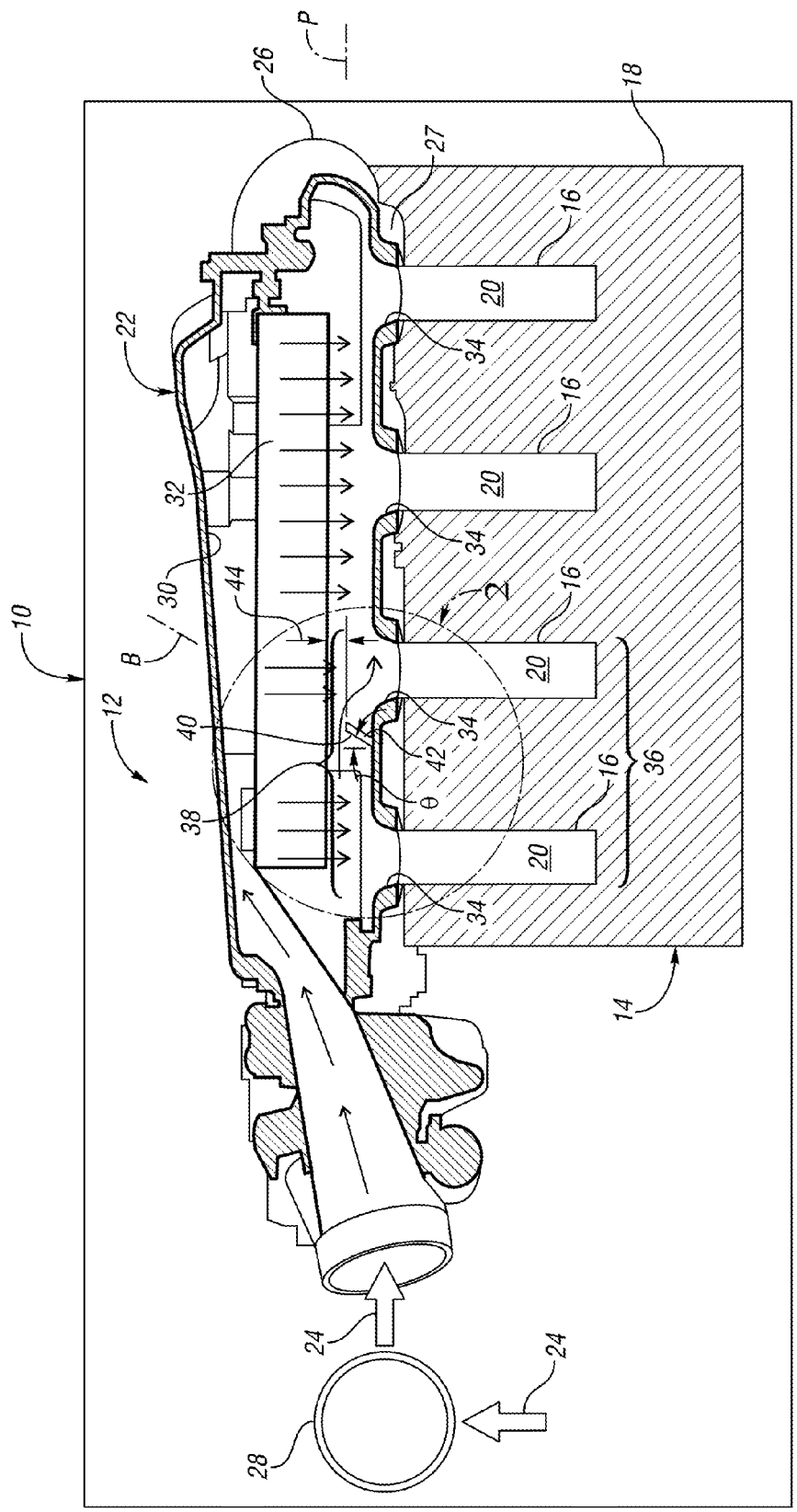
FIG. 1 is a schematic cross-sectional illustration of a vehicle including an engine and an intake assembly.

Referring to the drawings wherein like reference numbers correspond to like or similar components throughout the several figures, FIG. 1 schematically shows a vehicle 10 including an engine assembly 12. The engine assembly 12 includes an internal combustion engine 14 configured to power the vehicle 10. Specifically, the internal combustion engine 14 can provide torque to a transmission (not shown) to propel the vehicle 10. The internal combustion engine 14 may be a spark-ignited engine or a compression-ignited engine. In the depicted embodiment, the internal combustion engine 14 includes an engine block 18 having a plurality of cylinders 16. Each cylinder 16 at least partially defines a combustion chamber 20 and contains a reciprocating piston (not shown). The plurality of cylinders 16 may be arranged in any suitable manner, such as, without limitation, a V-engine arrangement, an inline engine arrangement, and a horizontally opposed engine arrangement.

The engine assembly 12 further includes an intake assembly 22 in fluid communication with the internal combustion engine 14. The intake assembly 22 is configured to receive intake air 24. A compressor 28, which may be part of a supercharger assembly or a turbocharger assembly, is disposed in fluid communication with the intake assembly 22 and is operable to pressurize the intake air 24 and direct the pressurized intake air 24 to the intake assembly 22. The intake assembly 22 further includes an intake manifold 26 configured to direct the intake air 24 to the combustion chamber 20 of each cylinder 16. The intake air 24 can be mixed with a fuel such as gasoline. Following the combustion of the air/fuel mixture (such as when ignited by a spark from a spark plug), an exhaust passage (not shown) may carry the exhaust gases out of each combustion chamber 20.

The intake manifold 26 defines an inner manifold cavity 30 and contains an intercooler 32 in the inner manifold cavity 30. The intercooler 32 is configured to reduce the temperature of the intake air 24 flowing through the intake manifold 26. Once the intake air 24 is cooled, the intake manifold 26 directs the intake air 24 to the combustion chambers 20 defined by each cylinder 16. To do so, the intake manifold 26 defines a plurality of ports 34 operable to direct the intake air 24 to the cylinders 16. As used herein, the term "ports" includes without limitation openings and holes capable of establishing fluid communication between the intake manifold 26 and the cylinders 16. Each port 34 is disposed in fluid communication with a respective cylinder 16. In particular, the intake manifold 26 includes a plenum 27 defining the ports 34. The plenum 27 may be elongated along a manifold axis P, and the ports 34 may be spaced apart from one another along the manifold axis P. The intake manifold 26 may also be elongated along the manifold axis P.

The engine 14 is configured for any suitable sequential cylinder firing order. As a consequence, during the intake stroke, the cylinders 16 draw different amounts of intake air 24 from the intake assembly 22, thereby possibly creating an issue commonly known as a cylinder-to-cylinder imbalance. The cylinder-to-cylinder imbalance is usually reflected in air-fuel ratio (AFR) cylinder imbalance and volumetric efficiency cylinder imbalance. AFR cylinder imbalance refers to the situation in which all the cylinders do not have substantially similar AFRs, and volumetric efficiency cylinder imbalance refers to the situation in which all the cylinders do not have substantially similar volumetric efficiencies. To maximize fuel efficiency and power, it is desirable to develop an engine assembly that has cylinders exhibiting substantially similar AFRs and volumetric efficiencies. It is also desirable to reduce the wave action of the gas flowing through intake assembly 22 to prevent, or at least inhibit, significant pressure loses. To minimize cylinder-to-cylinder imbalance and reduce the wave action, the intake assembly 22 may include one or more baffles 40 or any other suitable flow restrictor disposed at specific locations as discussed in detail below.

As discussed above, the engine 14 is configured for any suitable sequential cylinder firing order. As used herein, the term "firing" or "fire" refers to a combustion event in at least one of the cylinders 16. Thus, the "firing order" refers to chronological order of the combustion events in the cylinders 16. Specifically, the engine 14 fires a cylinder when the air/fuel mixture in that cylinder is ignited. The engine 14 is configured to fire at least two cylinders 16 in succession. In other words, the engine 14 is configured to fire two cylinders 16 consecutively. Thus, two cylinders 16 are configured to be fired consecutively. For the purposes of the present disclosure, "a pair of adjacent firing cylinders 36" means any pair of cylinders 16 in close proximity to one another that fire consecutively and with the minimum crank angle spacing between them. Each cylinder 16 of the pair of adjacent firing cylinders 36 is in fluid communication with at least one port 34. For the purposes of the present disclosure, the pair of ports 34 in fluid communication with the pair of adjacent firing cylinders 36 is referred to as "a pair of adjacent firing ports 38." To minimize cylinder-to-cylinder imbalance, the intake assembly 22 may include one or more baffles 40 disposed between the pair of adjacent firing ports 38.

In the depicted embodiment, at least one baffle 40 is disposed between the pair of adjacent firing ports 38. In operation, the baffle 40 restricts the flow between the pair of adjacent firing ports 38 to balance the amount of intake air 24 that flows into the pair of adjacent firing cylinders 36, thereby minimizing the cylinder-to-cylinder imbalance. The baffle 40 may be configured as a plate 42 and may protrude from the plenum 27. The baffle 40 may have a substantially planar shape and may be monolithically formed with the plenum 27 or any other part of the intake assembly 22. Alternatively, the baffle 40 may be a discrete component coupled to the plenum 27 or any other part of the intake assembly 22. Regardless of its construction, the baffle 40 is disposed in the inner manifold cavity 30 and can restrict fluid flow between the adjacent firing ports 38 to minimize cylinder-to-cylinder imbalance.

Figure 2:
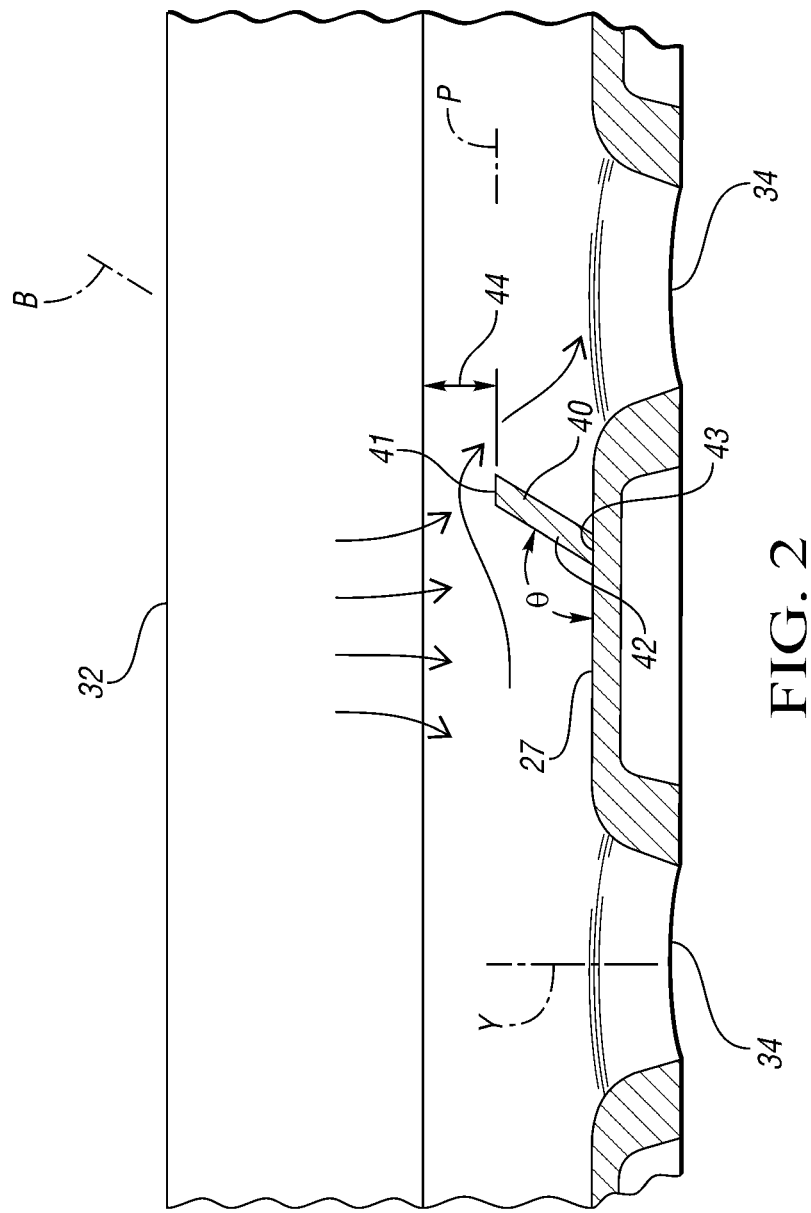
FIG. 2 is an enlarged schematic cross-sectional illustration of a portion of the intake assembly shown in FIG. 1, taken around section 2 of FIG. 1.

With reference to FIG. 2, the baffle 40 does not completely block fluid flow between the pair of adjacent firing ports 38 (FIG. 1). Rather, the baffle 40 defines an opening 44 that allows fluid communication between the pair of adjacent firing ports 38 (FIG. 1). The opening 44 may be defined between the intercooler 32 and a top edge 41 of the baffle 40. Alternatively, the opening 44 may be defined between a bottom edge 43 of the baffle 40 and the plenum 27 of the intake manifold 26. Irrespective of its location, the size of the opening 44 may affect the volumetric efficiency balance of the cylinders 16. Accordingly, the size of the opening 44 may be optimized so that the volumetric efficiencies of each cylinder 16 are the same or substantially similar. Optimization may be performed using a computer and may entail calculating the volumetric efficiency of each cylinder 16 at different engine speeds with the opening 44 having different areas. Then, the size of the opening 44 that yields the most constant volumetric efficiency across all cylinders 16 is selected.

The baffle 40 is disposed within the intake manifold 26 and may be elongated along the baffle axis B. The baffle axis B defines an oblique or right angle θ relative to the manifold axis P. Hence, the baffle axis B may be obliquely or perpendicularly angled with respect to the manifold axis P. For instance, the baffle 40 may be obliquely angled with respect to the manifold axis P to allow more intercooler surface area to be exposed to at least one of the cylinders 16 (FIG. 1), thus further improving cylinder-to-cylinder balance. The angular orientation of the baffle 40 may also be determined with respect to at least one of the ports 34. Each port 34 defines a port center axis Y. The baffle axis B may be substantially perpendicular or obliquely angled in relation to at least one of the port center axes Y.

Figure 3:
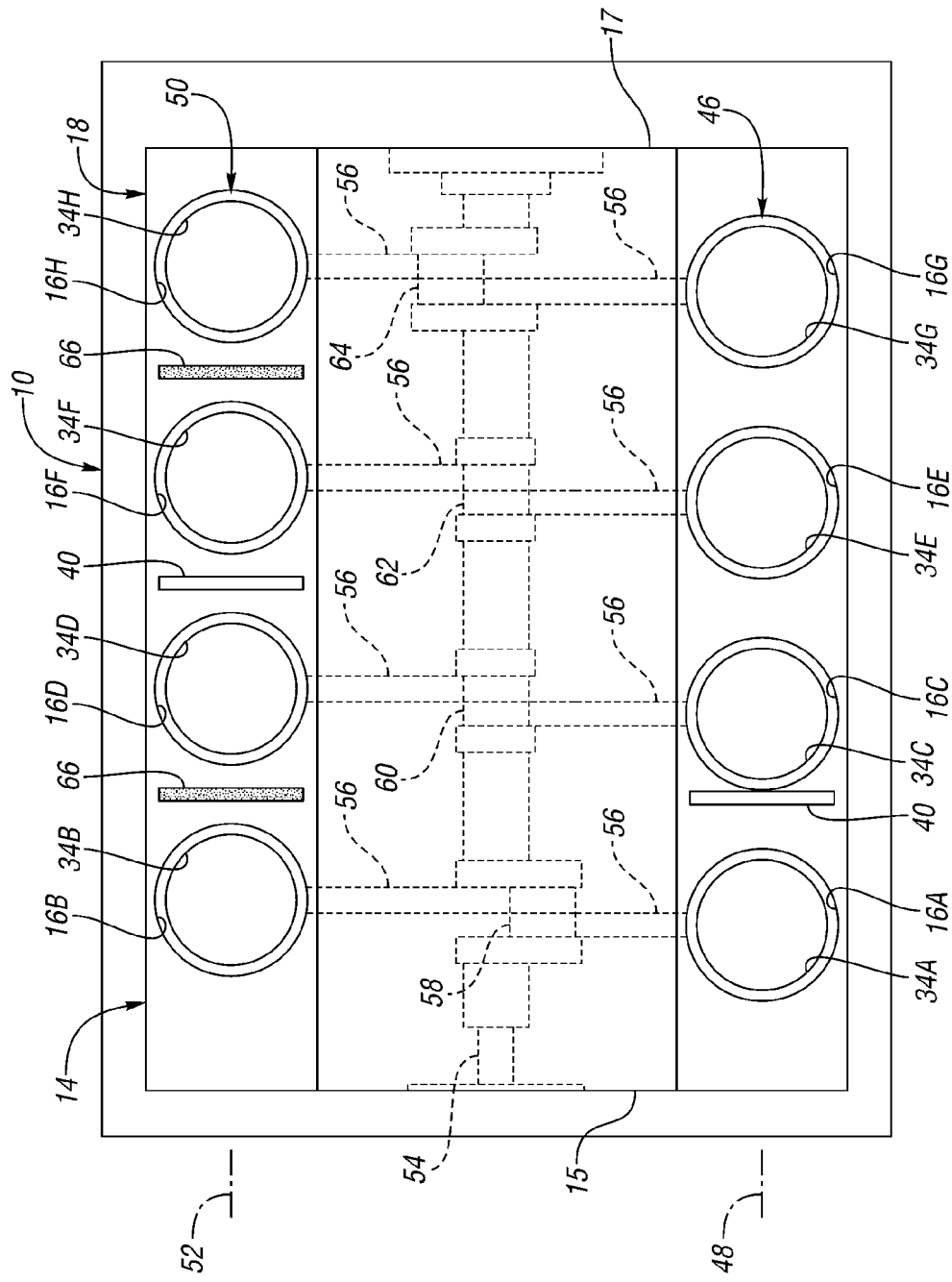
FIG. 3 is a schematic top view of the intake assembly and the engine shown in FIG. 1 in accordance with an embodiment of the present disclosure.

With reference to FIG. 3, in an embodiment, the internal combustion engine 14 defines a first cylinder 16A, a second cylinder 16B, a third cylinder 16C, a fourth cylinder 16D, a fifth cylinder 16E, a sixth cylinder 16F, a seventh cylinder 16G, and an eighth cylinder 16H. The first cylinder 16A, third cylinder 16C, fifth cylinder 16E, and seventh cylinder 16G may be arranged along a first cylinder bank 46, which defines a first bank axis 48. Therefore, the first cylinder 16A, third cylinder 16C, fifth cylinder 16E, and seventh cylinder 16G are spaced apart from one another along the first bank axis 48. The second cylinder 16B, fourth cylinder 16D, sixth cylinder 16F, and eighth cylinder 16H may be arranged along a second cylinder bank 50, which defines a second bank axis 52. Thus, the second cylinder 16B, fourth cylinder 16D, sixth cylinder 16F, and eighth cylinder 16H may be spaced apart from one another along the second bank axis 52.

The internal combustion engine 14 defines a first longitudinal end 15 and a second longitudinal end 17 opposite the first longitudinal end 17. The first cylinder 16A and the second cylinder 16B are disposed adjacent the first longitudinal end 15 of the internal combustion engine 14, whereas the seventh cylinder 16G and the eighth cylinder 16H are disposed adjacent the second longitudinal end 17 of the internal combustion engine 14. The third cylinder 16C is adjacent the first cylinder 16A and the fifth cylinder 16E. Thus, the third cylinder 16C may be disposed between the first cylinder 16A and the fifth cylinder 16E along the first bank axis 48. The fourth cylinder 16D is adjacent the second cylinder 16B and the sixth cylinder 16F. Hence, the fourth cylinder 16D may be disposed between the second cylinder 16B and the sixth cylinder 16F along the second bank axis 52. The fifth cylinder 16E is adjacent the third cylinder 16C and the seventh cylinder 16G. Thus, the fifth cylinder 16E may be located between the third cylinder 16C and the seventh cylinder 16G along the first bank axis 48. The sixth cylinder 16F is adjacent the fourth cylinder 16D and the eighth cylinder 16H. As such, the sixth cylinder 16F may be disposed between the fourth cylinder 16D and the eighth cylinder 16H along the second bank axis 52.

Each of the cylinders 16A, 16B, 16C, 16D, 16E, 16F, 16G, 16H contains a piston (not shown) configured to reciprocate within the cylinder. The engine assembly 12 further includes a crankshaft 54 and a plurality of rods 56 operatively interconnecting the crankshaft 54 to each piston (not shown). The operative interconnection between the pistons and the crankshaft 54 via the rods 56 allows the crankshaft 54 to rotate as the pistons reciprocate inside the cylinders. The crankshaft 54 further includes a first crankpin 58, a second crankpin 60, a third crankpin 62, and a fourth crankpin 64. Each of the crankpins 58, 60, 62, 64 may be coupled to two rods 56. In the depicted embodiment, the first, second, third, and fourth crankpins 58, 60, 62, 64 are angularly offset from one another by a suitable pin angle such as about ninety degrees. This pin angle defines the minimum crank angle spacing between cylinders.

As discussed above, the intake manifold 26 is disposed in fluid communication with the internal combustion engine 14 and is configured to direct the intake air 24 to each cylinder 16A, 16B, 16C, 16D, 16E, 16F, 16G, 16H. To this end, the intake manifold 26 defines a first port 34A, a second port 34B, a third port 34C, a fourth port 34D, a fifth port 34E, a sixth port 34F, a seventh port 34G, and an eighth port 34H. The first port 34A is disposed in fluid communication with the first cylinder 16A. The second port 34B is disposed in fluid communication with the second cylinder 16B. The third port 34C is disposed in fluid communication with the third cylinder 16C. The fourth port 34D is disposed in fluid communication with the fourth cylinder 16D. The fifth port 34E is disposed in fluid communication with the fifth cylinder 16E. The sixth port 34F is disposed in fluid communication with the sixth cylinder 16F. The seventh port 34G is disposed in fluid communication with the seventh cylinder 16G. The eighth port 34H is disposed in fluid communication with the eighth cylinder 16H.

In the depicted embodiment, the intake assembly 22 includes one baffle 40 disposed within the intake manifold 26 along the first cylinder bank 46 and another baffle 40 disposed within the intake manifold 26 along the second cylinder bank 50. As discussed above, each baffle 40 may protrude from the plenum 27 of the intake manifold 26 and is configured to restrict fluid flow in the inner manifold cavity 30. In particular, at least one baffle 40 is disposed between the first port 34A and the third port 34C; however, this baffle 40 may be positioned closer to the third port 34C than the first port 34A to avoid restricting too much fluid flow around the first longitudinal end 15 of the internal combustion engine 14. Another baffle 40 is disposed between the fourth port 34D and the sixth port 34F.

As discussed above, each baffle 40 should be disposed within the intake manifold 26 but between two cylinders 16 configured to be fired consecutively. In other words, each baffle 40 should be positioned between a pair of cylinders 16 configured to fire in succession. As discussed above, two cylinders 16 that are fired consecutively are referred to as the pair of adjacent firing cylinders 36 (FIG. 1) in the present disclosure. In determining the appropriate position of one or more baffles 40, the pair of adjacent firing cylinders 36 (FIG. 1) may be determined by identifying the pair of cylinders 16 in each cylinder bank 46, 50 that has a minimum crank angle spacing between them.

One way of identifying the pairs of adjacent firing cylinders 36 (FIG. 1) entails first writing down the firing order of the internal combustion engine 14. For example, the firing order of the internal combustion engine 14 depicted in FIG. 3 is 1-8-7-2-6-5-4-3. This means that the engine 14 fires the cylinders sequentially in the following order: first cylinder 16A, eighth cylinder 16H, seventh cylinder 16G, second cylinder 16B, sixth cylinder 16F, fifth cylinder 16E, fourth cylinder 16D, and third cylinder 16C. The crank angular spacing between each firing event may be 90 degrees.

After writing the firing order of the internal combustion engine 14, the firing order may be separated by cylinder bank 46, 50. For example, the firing order of the first cylinder bank 46 is 1-x-7-x-x-5-3, wherein the number 1 represents the first cylinder 16A, the number 7 represents the seventh cylinder 16G, the number 5 represents the fifth cylinder 16E, the number 3 represents the third cylinder 16C, each letter x represents a firing event in which a cylinder of the second cylinder bank 50 is fired, and each dash "-" represents the minimum crank angle spacing (e.g., 90 degrees). Since the firing order of the first cylinder bank 46 is cyclical, it can be observed that the two cylinders that have the minimum crank angle spacing (e.g., 90 degrees) between them in the first cylinder bank 46 are the first cylinder 16A and the third cylinder 16C. Thus, in this embodiment, the first cylinder 16A and the third cylinder 16C may be referred to as "a first pair of adjacent firing cylinders."

The firing order of the second cylinder bank 50 is x-8-x-2-6-x-4-x, wherein the number 8 represents the eighth cylinder 16H, the number 2 represents the second cylinder 16B, the number 6 represents the sixth cylinder 16F, the number 4 represents the fourth cylinder 16D, each letter x represents a firing event in which a cylinder of the first cylinder bank 46 is fired, and each dash "-" represents the minimum crank angle spacing (e.g., 90 degrees). It can then be observed that the two cylinders that have the minimum crank angle spacing (e.g., 90 degrees) between them in the second cylinder bank 50 are the second cylinder 16B and the sixth cylinder 16F. Therefore, in this embodiment, the second cylinder 16B and the sixth cylinder 16F may be referred to as "a second pair of adjacent firing cylinders."

After identifying the adjacent firing cylinders in the first and second cylinder banks 46, 50, it can be determined that one baffle 40 may be disposed between the first cylinder 16A and the third cylinder 16C. Specifically, one or more baffles 40 may be disposed within the intake manifold 26 between the first port 34A and the third port 34C. In the first bank cylinder 46, the baffle 40 may be disposed closer to the third cylinder 16C than the first cylinder 16A to avoid restricting too much fluid flow near the first longitudinal end 15 of the internal combustion engine 14.

Another baffle 40 may be disposed between the second cylinder 16B and the sixth cylinder 16F. Specifically, one or more baffles 40 may be disposed within the intake manifold 26 between the second port 26B and the sixth cylinder port 34F. In the second bank cylinder 50, given that the fourth cylinder 16D is located between the second cylinder 16B and the sixth cylinder 16F, the baffle 40 may be positioned between the fourth cylinder 16D and the sixth cylinder 16F. As such, this baffle 40 would be located in the middle of the second cylinder bank 50, thus balancing the fluid flow along the cylinders of the second cylinder bank 50. In particular, one or more baffles 40 may be disposed within the intake manifold 26 between the fourth port 34D and the sixth port 34F.

Once the positions of the baffles 40 are determined, size of the opening 44 of each baffle 40 may be determined to optimize the cylinder-to-cylinder imbalance reduction as described in detail above. Flow restrictors 66, such as baffles, may be positioned in the intake manifold 26 to reduce the wave action of the fluid flowing through the inner manifold cavity 30. Because the flow restrictors 66 are merely used to reduce the wave action of the fluid flow, the flow restrictors 66 may be less flow restrictive than the baffles 40 disposed between a pair of adjacent firing cylinders 36. In the depicted embodiment, at least one flow restrictor 66 is disposed within the intake manifold 26 between the second port 34B and the fourth port 34D, and another flow restrictor 66 is disposed within the intake manifold 26 between the sixth port 34F and the eighth port 34H. However, the flow restrictors 66 may be positioned at other locations within the intake manifold 26.

Figure 4:
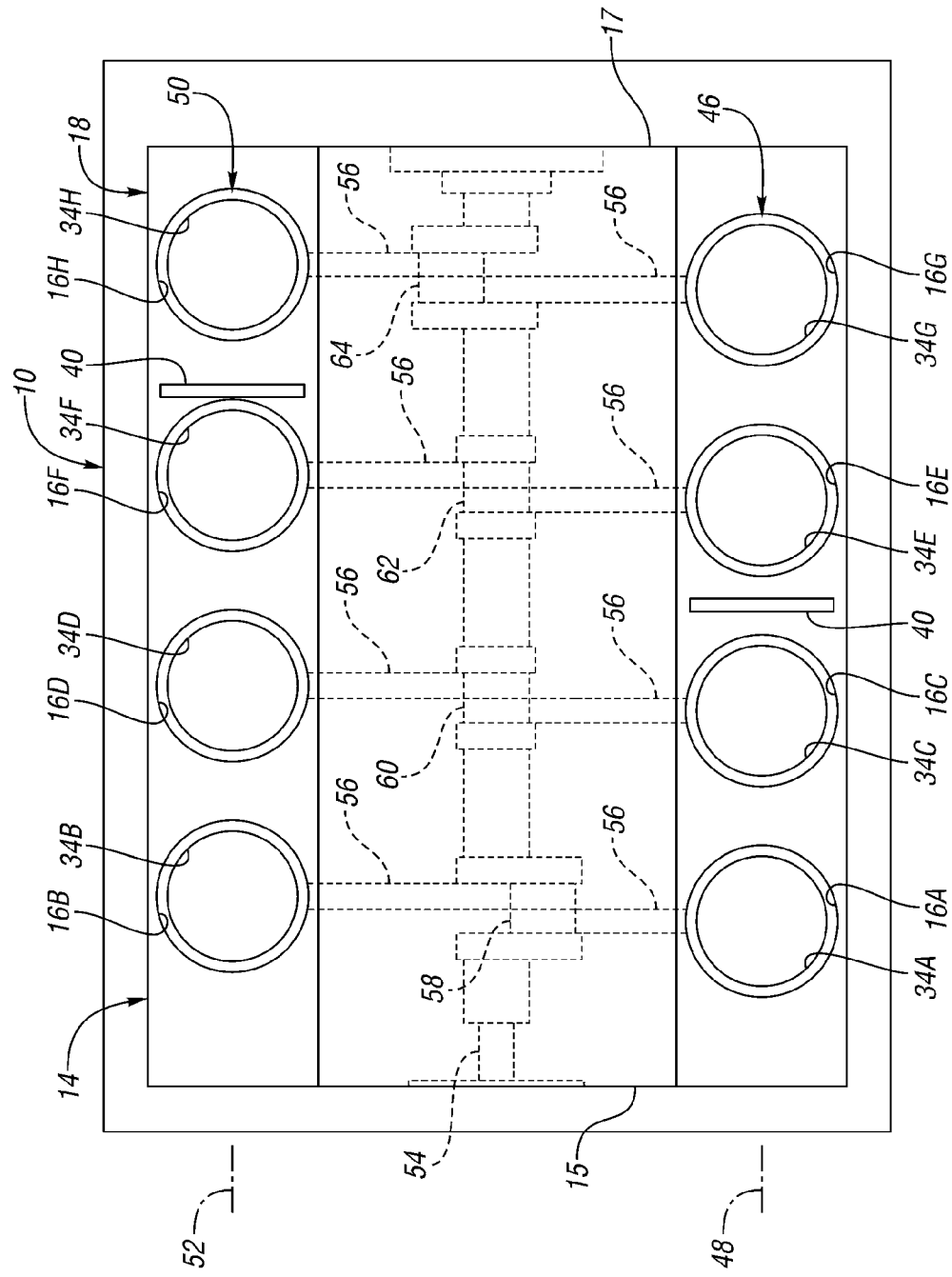
FIG. 4 is a schematic top view of an intake assembly and the engine shown in FIG. 1 in accordance with an alternative embodiment of the present disclosure.

With reference to FIG. 4, in another embodiment, the intake assembly 22 includes baffles 40 at different locations from the previously described embodiment because the internal combustion engine 14 of this embodiment has a different firing order. In particular, at least one baffle 40 is disposed within the intake manifold 26 between the third port 34C and the fifth port 34E. At least one other baffle 40 is disposed within the intake manifold 26 between the sixth port 34F and the eighth port 34H.

The firing order of the internal combustion engine 14 depicted in FIG. 4 is 1-5-4-3-6-8-7-2. This means that the cylinders are configured to be fired sequentially in the following order: first cylinder 16A, fifth cylinder 16E, fourth cylinder 16D, third cylinder 16C, sixth cylinder 16F, eighth cylinder 16H, seventh cylinder 16G, and second cylinder 16B. The crank angular spacing between each firing event may be 90 degrees.

As discussed above, the firing order is then separated by cylinder bank 46, 50. In this embodiment, the firing order of the first cylinder bank 46 is 1-5-x-3-x-x-7-x, wherein the number 1 represents the first cylinder 16A, the number 5 represents the fifth cylinder 16E, the number 3 represents the third cylinder 16C, the number 7 represents the seventh cylinder 16G, each letter x represents a firing event in which a cylinder of the second cylinder bank 50 is fired, and each dash "-" represents the minimum crank angle spacing (e.g., 90 degrees). It can be observed that the two cylinders that have the minimum crank angle spacing (e.g., 90 degrees) between them in the first cylinder bank 46 are the first cylinder 16A and the fifth cylinder 16E. Thus, in this embodiment, the first cylinder 16A and the fifth cylinder 16E may be referred to as "a first pair of adjacent firing cylinders."

The firing order of the second cylinder bank 50 is x-x-4-x-6-8-x-2, wherein the number 4 represents the fourth cylinder 16D, the number 6 represents the sixth cylinder 16F, the number 8 represents the eighth cylinder 16H, the number 2 represents the second cylinder 16B, each letter x represents a firing event in which a cylinder of the first cylinder bank 46 is fired, and each dash "-" represents the minimum crank angle spacing (e.g., 90 degrees). It can then be observed that the two cylinders that have the minimum crank angle spacing (e.g., 90 degrees) between them in the second cylinder bank 50 are the sixth cylinder 16F and the eighth cylinder 16H. Therefore, in this embodiment, the sixth cylinder 16F and the eighth cylinder 16H may be referred to as "a second pair of adjacent firing cylinders."

After identifying the adjacent firing cylinders in the first and second cylinder banks 46, 50, it can be determined that at least one baffle 40 may be disposed between the first cylinder 16A and the fifth cylinder 16E. Given that the third cylinder 16C is located between the first cylinder 16A and the fifth cylinder 16E in the first cylinder bank 46, the baffle 40 may be positioned between the third cylinder 16C and the fifth cylinder 16E. As such, this baffle 40 is located in the middle of the first cylinder bank 46, thereby balancing the fluid flow along the cylinders of the first cylinder bank 46. Specifically, at least one baffle 40 may be disposed within the intake manifold 26 between the third port 34C and the fifth port 34E.

Another baffle 40 may be disposed between the sixth cylinder 16F and the eighth cylinder 16H. Specifically, one or more baffles 40 may be disposed within the intake manifold 26 between the sixth port 34F and the eighth port 34H. In the second bank cylinder 50, the baffle 40 may be disposed closer to the sixth cylinder 16F than to the eighth cylinder 16H to avoid restricting too much fluid flow near the second longitudinal end 17 of the internal combustion engine 14.

Once the positions of the baffles 40 are determined, the size of the opening 44 of each baffle 40 may be determined to optimize the cylinder-to-cylinder imbalance reduction as described in detail above. Flow restrictors 66 may be added in the intake manifold 26 to reduce the wave action of the fluid flowing through the inner manifold cavity 30 as shown in FIG. 3.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. An engine assembly comprising:
an engine including a plurality of cylinders, the plurality of cylinders including a pair of adjacent firing cylinders, wherein the cylinders comprising the pair of adjacent firing cylinders are configured to fire consecutively, and the pair of adjacent firing cylinders refers to two of a plurality of cylinders that are adjacent to each other, fire consecutively, and have a minimum crank angle spacing therebetween with respect to the rest of the plurality of cylinders; and
an intake manifold including a plenum, the plenum defining a plurality of ports, the intake manifold defining an inner manifold cavity, the inner manifold cavity being in fluid communication with each port, each port being in fluid communication with one of the plurality of cylinders, the plurality of ports including a pair of ports, wherein each port of the pair of ports is disposed in fluid communication with one of the pair of adjacent firing cylinders, and wherein the intake manifold further includes at least one baffle protruding directly from the plenum into and toward the inner manifold cavity, wherein only one of the at least one baffle is disposed only between the pair of ports to restrict fluid flow within the intake manifold between the pair of ports; and
wherein the plenum is elongated along a manifold axis, the at least one baffle extends from the plenum, the at least one baffle is elongated along a baffle axis, and the baffle axis is substantially perpendicular to the manifold axis.

2. The engine assembly of claim 1, further comprising an intercooler disposed within the intake manifold, wherein the intercooler and the baffle jointly define an opening therebetween, and the opening is configured to allow fluid flow between the pair of ports.

3. A vehicle comprising:
an engine including a first cylinder bank and a second cylinder bank, the first cylinder bank including a first pair of adjacent firing cylinders, the engine being configured to fire the first pair of adjacent firing cylinders in succession, the second cylinder bank including a second pair of adjacent firing cylinders, the engine being configured to fire the second pair of adjacent firing cylinders in succession, wherein the first pair of adjacent firing cylinders refers to two of a plurality of first cylinders in the first cylinder bank that are adjacent to each other, fire consecutively, and have a minimum crank angle spacing therebetween with respect to the rest of the plurality of first cylinders, and the second pair of adjacent firing cylinders refers to two of a plurality of second cylinders in the second cylinder bank that are adjacent to each other, fire consecutively, and have a minimum crank angle spacing therebetween with respect to the rest of the plurality of second cylinders;
an intake assembly including an intake manifold, the intake manifold including a plenum, the plenum defining a first pair of ports and a second pair of ports, the intake manifold defining an inner manifold cavity, the inner manifold cavity being in fluid communication with each port of the first pair of ports and the second pair of ports, each port of the first pair of ports being disposed in fluid communication with one of the first pair of cylinders, each port of the second pair of ports being in fluid communication with one of the second pair of cylinders; and
wherein the intake assembly further includes first and second baffles disposed within the intake manifold, each of the first and second baffles protruding directly from the plenum into and toward the inner manifold cavity, the first baffle is disposed only between the first pair of ports, and the second baffle is disposed only between the second pair of ports, the first and second baffles collectively including all the baffles inside the intake manifold;
wherein the plenum is elongated along a manifold axis, the first baffle extends from the plenum, the first baffle is elongated along a baffle axis, and the baffle axis is substantially perpendicular to the manifold axis; and
wherein all the baffles inside the intake manifold are disposed within the inner manifold cavity between the first and second pairs of ports.

4. The vehicle of claim 3, wherein the engine defines first, second, third, fourth, fifth, sixth, seventh, and eighth cylinders, the first, third, fifth, and seventh cylinders being part of the first cylinder bank, the second, fourth, sixth, and eighth cylinders being part of the second cylinder bank, the first pair of cylinders includes the first and third cylinders, and the first baffle is disposed within the intake manifold between the first and third cylinders.

5. The vehicle of claim 3, wherein the engine defines a first longitudinal end and a second longitudinal end, the first pair of cylinders being located closer to the first longitudinal end than to the second longitudinal end.

6. The vehicle of claim 4, wherein the second pair of cylinders includes the second cylinder and the sixth cylinder, and the second baffle is disposed within the intake manifold between the second and sixth cylinder.

7. The vehicle of claim 6, wherein the second baffle is disposed within the intake manifold between the fourth cylinder and the sixth cylinder.

8. The vehicle of claim 3, wherein the engine defines first, second, third, fourth, fifth, sixth, seventh, and eighth cylinders, the first, third, fifth, and seventh cylinders being part of the first cylinder bank, the second, fourth, sixth, and eighth cylinders being part of the second cylinder bank, the first pair of cylinders includes the first and fifth cylinders, and the first baffle is disposed within the intake manifold between the first and fifth cylinders.

9. The vehicle of claim 8, wherein the first baffle is disposed within the intake manifold between the third and fifth cylinders.

10. The vehicle of claim 9, wherein the second pair of cylinders includes the sixth cylinder and the eighth cylinder, and the second baffle is disposed within the intake manifold between the sixth cylinder and the eighth cylinder.

11. The vehicle of claim 10, wherein the second baffle is disposed closer to the sixth cylinder than to the eighth cylinder.

12. The vehicle of claim 3, wherein the intake assembly includes a plurality of ports, the plurality of ports including the first pair of ports and a second pair of ports, and the intake assembly further includes at least one flow restrictor disposed within the intake manifold and between two of the plurality of ports.

13. The vehicle of claim 12, wherein the intake assembly includes an intercooler disposed within the intake manifold, wherein the intercooler and the first baffle jointly define an opening therebetween, and wherein the opening is configured to allow fluid flow between the first pair of ports.

14. A method of manufacturing an engine assembly, comprising:
fluidly coupling an intake assembly to an internal combustion engine, the internal combustion engine including a plurality of cylinders, the intake assembly including an intake manifold, the intake manifold including a plenum, the plenum defining a plurality of ports, the plenum is elongated along a manifold axis, the intake manifold defining an inner manifold cavity, the inner manifold cavity being in fluid communication with each of the plurality of ports, each port being in fluid communication with one of the plurality of cylinders, the plurality of ports including a pair of ports;

identifying a pair of adjacent firing cylinders of the plurality of cylinders, wherein the pair of adjacent firing cylinders refers to two of the plurality of cylinders that are adjacent to each other, fire consecutively, and have a minimum crank angle spacing therebetween with respect to the rest of the plurality of cylinders, and each port of the pair of ports is disposed in fluid communication with one of the pair of adjacent firing cylinders; and disposing at least one baffle within the intake manifold such that the at least one baffle protrudes directly from the plenum into and toward the inner manifold cavity, wherein disposing the at least one baffle within the intake manifold includes disposing a single baffle only between the pair of ports to restrict fluid flow between the pair of ports such that the single baffle extends from the plenum, the single baffle is elongated along a baffle axis, and the baffle axis is substantially perpendicular to the manifold axis.

\* \* \* \* \*